United States Patent [19]
Longshore et al.

[11] Patent Number: 5,146,610
[45] Date of Patent: Sep. 8, 1992

[54] DISCONTINUOUS TRANSMISSION MUTING/UNMUTING SYSTEM WITH LINK CONTINUITY

[75] Inventors: Theodore F. Longshore, Hoffman Estates, Ill.; William H. Balacky, Hammond, Ind.; William P. DeClerk, Palatine, Ill.; James C. Baker, Hanover Park, Ill.; Paul S. Everline, Schaumburg, Ill.; Christopher G. Rittler, Elmhurst, Ill.

[73] Assignee: Motorola, Inc., Schaumburg, Ill.

[21] Appl. No.: 442,956

[22] Filed: Nov. 29, 1989

[51] Int. Cl.⁵ .......................... H04Q 7/00; H04Q 9/02; H04B 1/10
[52] U.S. Cl. .................................... 455/35.1; 455/45; 455/218
[58] Field of Search ......................... 455/33.1, 35, 34.2, 455/44, 42, 212, 218, 221, 205, 63, 34.1, 45, 296, 35.1; 370/69.1, 71

[56] References Cited

U.S. PATENT DOCUMENTS

| | | |
|---|---|---|
| 3,760,355 | 9/1973 | Bruckert . |
| 3,801,956 | 4/1974 | Braun et al. . |
| 3,855,576 | 12/1974 | Braun et al. . |
| 4,135,158 | 1/1979 | Parmet ................................. 455/159 |
| 4,625,319 | 11/1986 | Krawity ................................ 375/50 |
| 4,901,307 | 2/1990 | Gelhouser et al. ................... 370/18 |
| 4,984,290 | 1/1991 | Levene et al. ......................... 455/33 |

OTHER PUBLICATIONS

The ARRL Handbook for the Radio Amateur, ed. Charles L. Hutchinson, American Radio Rely League, Newington, CT, 1984, "Frequency Modulation" section of Chapter 18, pp. 18-18 to 18-26.

Primary Examiner—Reinhard J. Eisenzopf
Assistant Examiner—Lisa Charouel
Attorney, Agent, or Firm—Shawn B. Dempster; F. John Motsinger

[57] ABSTRACT

A system for facilitating link continuity and prompt supervisory control in a communication system with discontinuous transmissions comprising varying the carrier power in a first communication unit and varying frequency deviation of a modulating signal to provide a continuous signal detectable by a second communication unit, where continuous monitoring at the second communication unit allows for rapid detection and reaction to received supervisory control signals through the use of continually comparing the received supervisory signal to an expected signal and qualifier signal to enhance the reaction time of the second communication unit.

20 Claims, 3 Drawing Sheets

DISCONTINUOUS TRANSMISSION MUTING/UNMUTING SYSTEM WITH LINK CONTINUITY

TECHNICAL FIELD OF INVENTION

The present invention relates generally to radio frequency communication systems, and more particularly to cellular radio frequency communication systems.

BACKGROUND OF THE INVENTION

Conventional cellular radiotelephone systems attempt to conserve power consumption of a subscriber unit by decreasing the transmit power of the subscriber unit (mobile or portable) during discontinuous voice transmissions from the subscriber unit to a cell site. However, a predetermined set of supervisory audio tones (SAT) is also typically modulated with the voice signal (constituting a composite signal). The SATs are used to maintain continuity with cell sites during voice transmission, and to differentiate the intended subscriber unit from surrounding subscriber units. Discontinuous transmission generally causes the cell site to lose communication with the mobile once the voice (audio) ceases due to the signal strength falling below a detectable level. The cell site therefore has virtually no information as to whether the mobile (source) is within communication distance or whether it intends to re-establish communication.

If the cell site does not receive the SAT for a predetermined period of time, the cell site typically attempts to re-establish link continuity via an audit message. In addition, a destination unit (landline or other mobile), after no longer receiving audio from the mobile, may continually receive noise from the voice channel unless the cell site mutes the audio on that channel after detecting that the mobile has dropped its power level. Although the problems of inefficient power consumption and maintaining link continuity during discontinuous transmissions are evident in cellular communication systems, they also adversely affect numerous other communication systems which desire efficient power control or communication link continuity.

Accordingly, there exists a need to maintain communication between a subscriber unit (or first communication unit) and a cell site (or second communication unit) during discontinuous transmission while also limiting power consumption by the subscriber unit. In addition, timely detection of discontinuous transmission and transmission must be provided to allow prompt muting and unmuting of audio signals thereby substantially reducing undesirable audio noise interference and preventing loss of valid audio signals.

BRIEF SUMMARY OF THE INVENTION

These needs and others are substantially met through the discontinuous transmission muting/unmuting system with link continuity disclosed below. A signalling scheme comprising, after a first event, such as temporary termination of audio signal, at a first communication unit, such as a subscriber unit, decreasing power of a carrier signal, and increasing the bandwidth of a modulating signal to a point not to exceed a predetermined bandwidth, produces a reduced power, increased frequency deviation signal, such as a digital sub-audible supervisory signal, that is transmitted to a second communication unit, such as a cell site.

The reduced power, increased deviation signal maintains a predetermined signal to noise level capable of being detected by the second communication unit. Prompt supervisory control at the second communication unit is facilitated by detecting a continuous supervisory signal, such as the reduced power, increased deviation signal, continually comparing a most recently received portion of the supervisory signal to at least an expected signal, comparing a previously received portion of the supervisory signal to a qualifier signal, taking a first course of action, such as unmuting audio, if the most recently received portion and the previously received portion is substantially similar to the expected signal and the qualifier signal, continuing comparing a subsequent portion of the supervisory signal to the expected signal, and taking a second course of action, such as muting audio, if the subsequent portion is substantially different from the expected signal.

Prompt supervisory control further comprises comparing a second expected signal to the supervisory signal and muting if the supervisory signal is substantially similar to the second expected signal. The first communication unit also, after a subsequent second event, such as commencement of audio signals, decreases frequency deviation of the modulating signal, and increases power of the carrier signal back to a predetermined level to provide for transmission of both voice and supervisory signals.

PREFERRED EMBODIMENT OF THE INVENTION

Figure 1A:
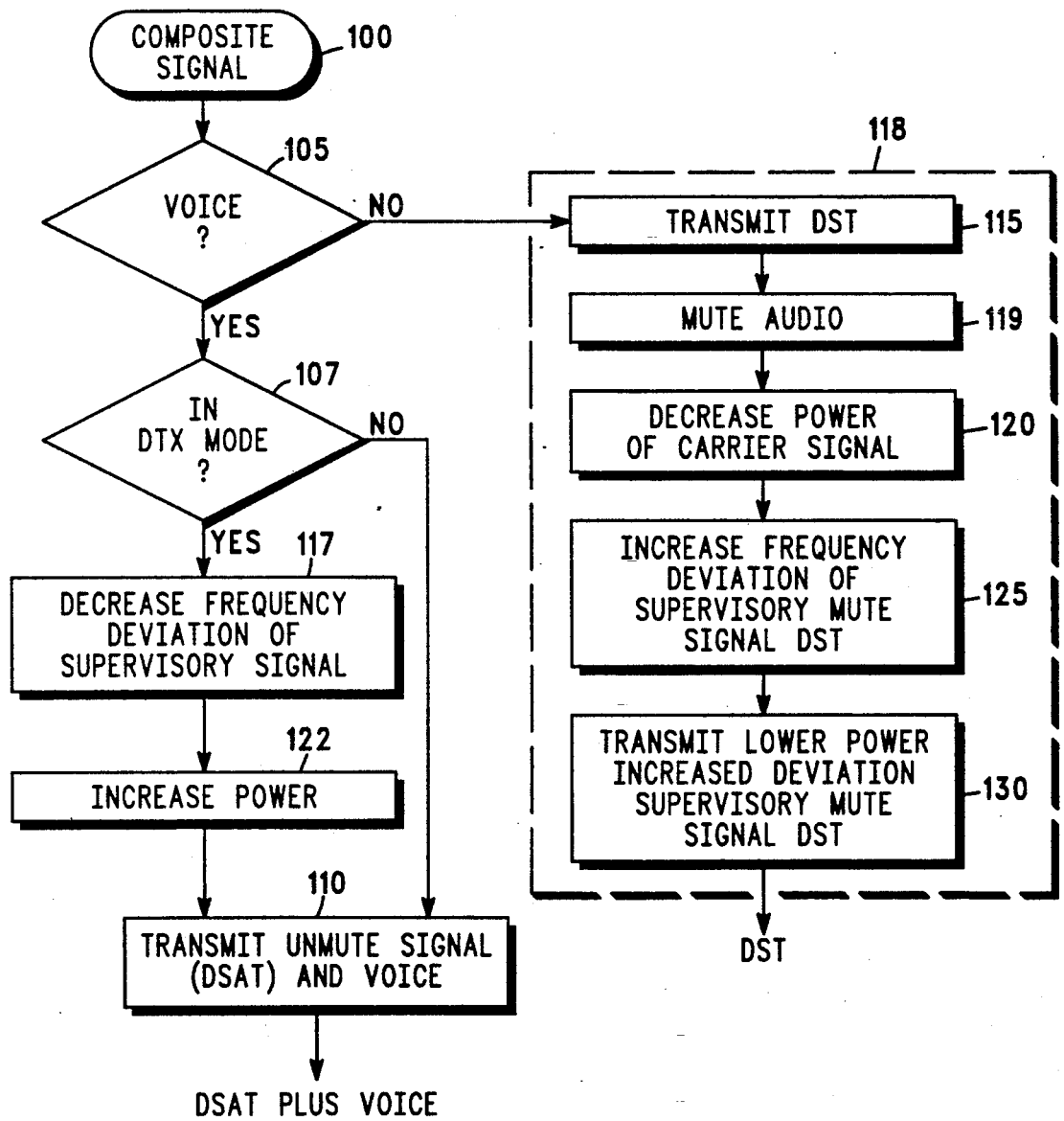
FIG. 1A is a flow chart generally depicting a muting/unmuting signalling method as applied to a cellular subscriber unit in accordance with the invention.

In a narrowband frequency division multiple access (FDMA) system, the composite modulating signal of voice (audio) signal and supervisory signal are modulated not to exceed a predetermined bandwidth. The preferred embodiment as depicted in FIG. 1A, uses a composite modulating signal (100) comprised of an information signal, such as a voice signal, and a continuous digital, sub-audible, supervisory signal for communicating from the subscriber unit to the cell site. The supervisory signal as depicted is a mute or unmute signal sent to the cell from the subscriber unit depending on whether the subscriber is in a discontinuous transmission mode (no voice being transmitted). However, as appreciated by those skilled in the art, the invention may be readily applied to any signal as may be appropriate to the particular system.

The subscriber unit determines whether a first event occurred, for example, whether voice is available to be transmitted (105) to the cell site. When voice is available, a digital sub-audible, supervisory unmute signal (DSAT) plus the voice signal are transmitted (110) as the composite modulating signal to the cell site. The unmute signal notifies the cell site to unmute its audio receiver for that voice channel. If however, a subsequent second event occurs, for example, voice is substantially unavailable, the subscriber unit will enter the discontinuous transmission mode (DTX) (118).

In this mode, DST is transmitted (115) to the cell site to begin muting the audio receivers at the cell site. The subscriber unit then mutes audio (119) and substantially removes the voice signal to provide bandwidth for an increase in frequency deviation of the sub-audible supervisory signal. This helps prevent subsequent overdeviation should the subscriber begin speaking. The system may also remove only that portion of the voice signal that is necessary to provide the needed bandwidth. Thereafter, the subscriber unit reduces the transmit power (120) of the carrier signal to a predetermined level and increases the frequency deviation (125) of the supervisory sub-audible signal to a level not exceeding the available bandwidth of the channel in an effort to maintain a predetermined signal to noise ratio. The decrease in subscriber transmit power is therefore virtually transparent to the cell site. The result is a reduced power, increased deviation signal (DST=the logical inverse of DSAT in a digital system). DST is continued to be transmitted (130) to the cell site. The reduction in power and the increase in deviation should occur rapidly enough to prevent corruption of the received signal at the cell site.

Consequently, communication link continuity is maintained via the supervisory signal during discontinuous transmissions while preserving power in the subscriber unit. When audio resumes, the subscriber unit no longer requires DTX (107) and proceeds to decrease the frequency deviation (117) of the supervisory signal to provide bandwidth for the audio signal, and increases the power of the carrier (122) back to its nominal transmit power level or some other predetermined power level. Once power is effectively increased, a digital unmute supervisory signal (DSAT) and audio signal (both make up the composite signal) is transmitted to the cell site (110) to effectuate rapid unmute control at the cell site. In addition, only the DSAT may be initially transmitted instead of both signals (audio plus DSAT) to provide the cell site sufficient time to unmute its receivers.

Figure 1B:
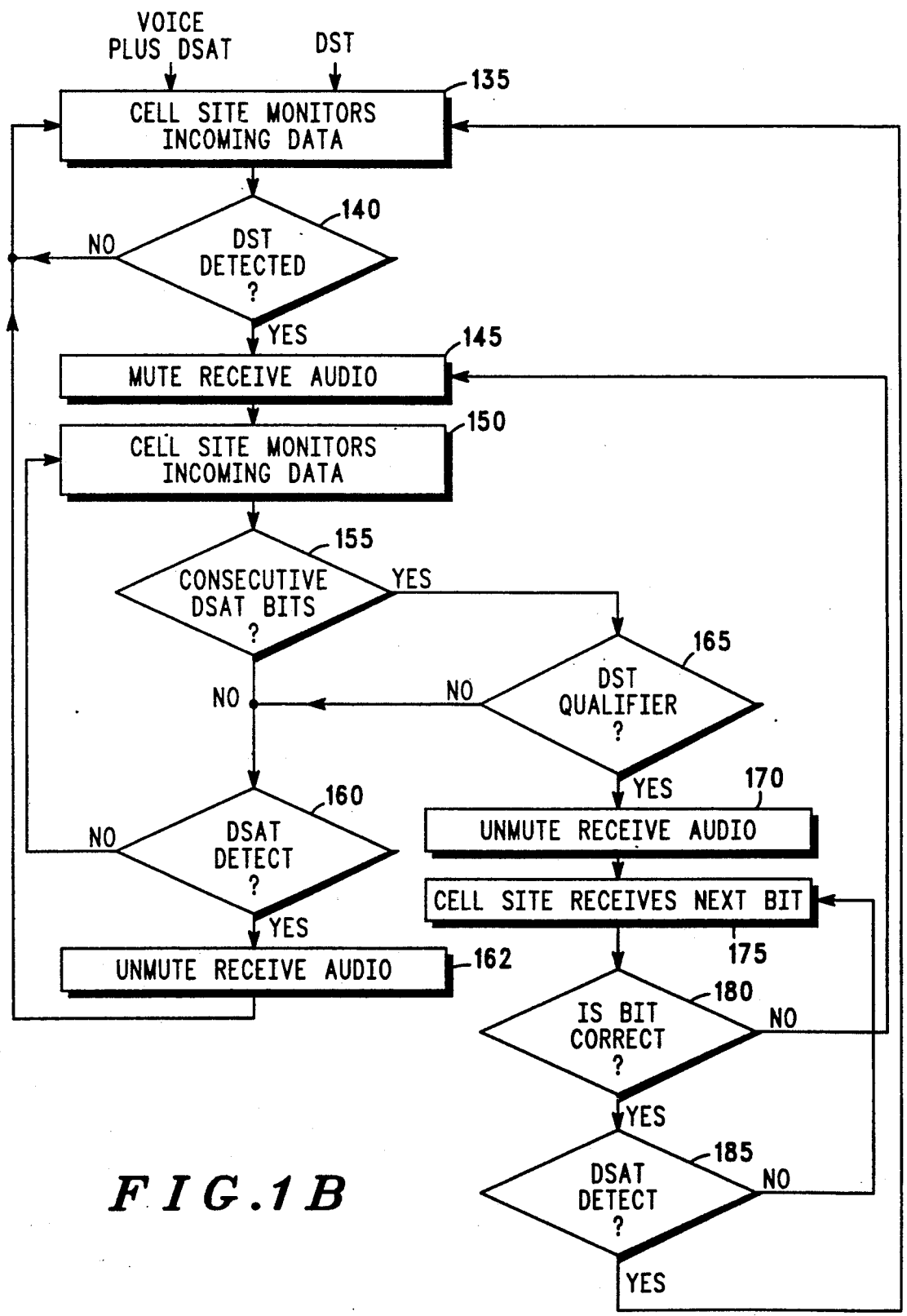
FIG. 1B is a flow chart generally depicting a muting/unmuting method as applied to a cell site in accordance with the invention.

FIG. 1B depicts the process at the cell site. Due to the continuous supervisory signal, the cell site may continually (continuous bit by bit) monitor the incoming data (135) over the voice channel to determine whether the subscriber unit is in DTX (sending DST) or in its normal transmit mode (transmitting DSAT). Therefore, this system is able to provide both a rapid mute and a rapid unmute of the cell site receivers to prevent undesirable noise from being transmitted to a listener and also to prevent valid audio from being lost due to a slowly unmuted receiver.

Rapid muting is facilitated by continually comparing at least a portion of the continuous supervisory signal (140), such as a predetermined number of bits, to a second expected signal, such as a stored replica of an expected supervisory mute signal (DST), and mutes audio (145) if the supervisory signal is substantially similar to the replica of the supervisory mute signal. After a mute condition is detected and acted upon, a rapid unmute may be facilitated by continually monitoring additional incoming bits (150) and now comparing a most recently received portion of the supervisory signal (which may have changed to DSAT) to the expected supervisory unmute signal (DSAT) while storing a portion of previously received bits to be later compared to a qualifier signal.

Once the cell site determines that it has received a predetermined number of valid consecutive DSAT bits (155), it verifies (165) that these bits were preceded by a valid number of previously received DST bits. This is achieved by comparing the qualifier, which is a replica of the expected DST to the stored, previously received bits. If they are not substantially similar, a larger block (or word) of DSAT is searched for (160). If the consecutive bits (155) are considered substantially invalid (they still may be DST), the cell site continues to monitor for the larger block of DSAT (160) bits. If no valid block is detected, the cell site continues to monitor incoming data (150). If however, a valid block is detected, an unmute condition is activated (162).

If however, it is determined that the most recently received portion and the previously received portion are substantially similar to the replica of a supervisory unmute signal and the qualifier signal, in other words, the most recently received bits are determined to be DSAT, and the previously received bits were determined to be DST, the cell site concludes that a valid unmute signal was received and takes a first course of action by unmuting its receivers (170). However, the cell site continues to compare subsequent incoming supervisory signal bits to provide a rapid mute of audio receivers.

Accordingly, the cell site receives the next subsequent bit (175) and compares it against the replica of DSAT (180) and determines its validity. This is achieved using bit error detection techniques as commonly known in the art. If an error limit is exceeded, the cell site mutes the receive audio (145). This is continued for some portion of subsequent received bits until it is determined that DSAT is detected (185). If DSAT is detected, the incoming data is continually monitored (135).

As appreciated by those skilled in the art, the order in which the above steps in the system occur, may be modified to suit a specific application. For example, the subscriber unit upon unmuting may increase power of the carrier signal before decreasing frequency deviation to prevent a detected fast fading condition. Although the preferred embodiment incorporates the invention in a cellular radiotelephone system, the disclosed invention may be readily applied to any communication system using a modulating signal (need not be a composite signal) in a limited bandwidth system.

Figure 2:
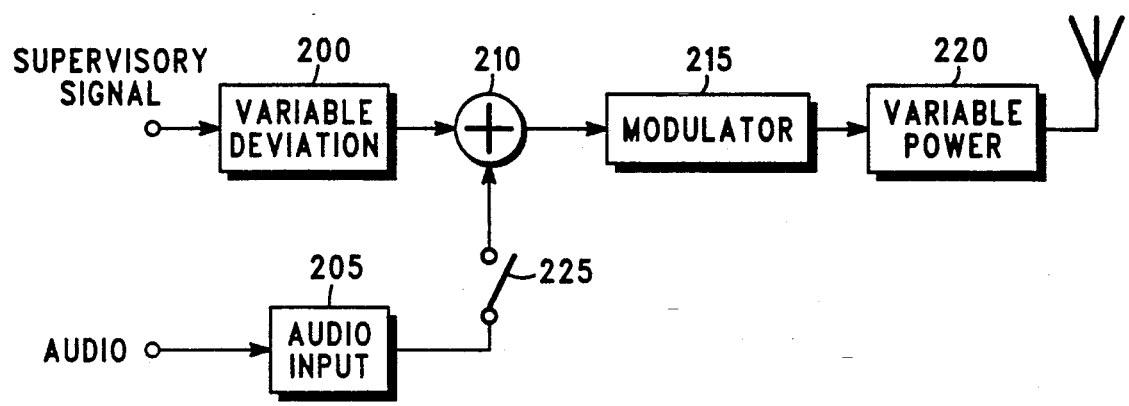
FIG. 2 is a general block diagram depicting the invention as applied to a transmitter section in a cellular radiotelephone.

FIG. 2 depicts the transmit block of the subscriber unit. The subscriber unit may be functionally similar to the portable type cellular radiotelephone as set forth in Motorola Inc. Instruction Manual 68P81046E60-B entitled DYNA T.A.C. Cellular Portable Telephone, or any other suitable communication unit. The transmit block is comprised of a variable deviation block (200), an audio input block (205), a summing block (210), a modulation block (215), and a variable power block (220).

During normal transmit situations, the audio mute switch (225) is closed, and audio is coupled into the audio input block (205) which may be comprised of amplification stages. The supervisory signal (modulating signal) is coupled to the variable deviation block (200) which is comprised of a variable gain stage. The two signals are summed (210) and modulated (215) with a carrier having a nominal power level controlled by the variable power block (220). During a muting condition, the audio mute switch (225) is opened to prevent audio from being summed with the supervisory signal. A variable gain amplifier in the deviation block (200) increases the bandwidth of the signal via frequency deviation. This signal becomes the modulation input for the modulation (215) whose carrier power is decreased by a variable power amplifier in the variable power stage (220). This signal is transmitted as the reduced power, increased deviation output signal.

Therefore, the means for increasing the bandwidth of the modulating signal comprises the variable gain amplifier and is operably coupled to the means for modulating a carrier signal. The means for decreasing power of the carrier signal is comprised of the variable power amplifier and is also operably coupled to the means for modulating. The means for modulating, the means for increasing the bandwidth, and the means for decreasing power of the carrier signal are all devices as understood by those with ordinary skill in the art.

Figure 3:
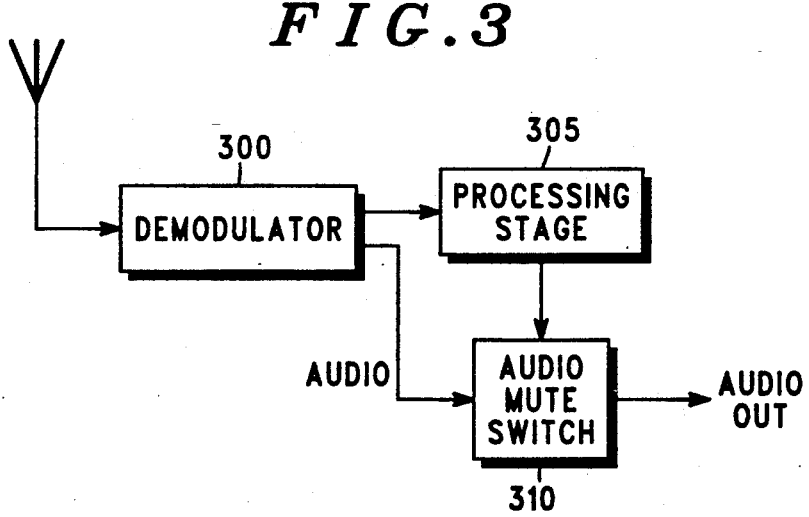
FIG. 3 is a general block diagram depicting the invention as applied in a receiver section in a cellular base site.

FIG. 3 depicts the receive block in a cell site providing rapid control based upon continuously received supervisory signals. The receive block comprises a demodulator block (300), a processor stage (305), and an audio mute switch (310). The demodulator (300) is understood to comprise the appropriate components to filter and process the composite signal into a digital and audio signal as understood in the art. Further, it continually detects the supervisory signal and determines the state of each bit. The processor stage (305) comprises a digital signal processor for continually comparing the most recently received portion of the supervisory signal to an expected signal, and for determining a first preliminary course of action, which is to deactivate the audio mute switch (310) if the most recently received portion is substantially similar to the expected signal. In addition, it further comprises means for continually comparing a subsequent portion of the supervisory signal to the expected signal, and means for taking a second course of action, which is to activate the mute switch (310), if the subsequent portion is substantially different from the expected signal. A processing stage of this type is also understood in the art.

What we claim is:

1. A method for facilitating communication link continuity, comprising the steps of:
   (a) decreasing power of a carrier signal modulated by a modulating signal; and
   (b) increasing the frequency deviation of the modulating signal to a point not to exceed a predetermined bandwidth such that the signal to noise ratio of the modulated carrier signal is maintained at a predetermined threshold.

2. The method of claim 1 wherein;
   (a) the modulating signal is comprised of a first and a second signal; and
   (b) the step of increasing the frequency deviation of the modulating signal comprises removing a portion of the first signal from the modulating signal and increasing the frequency deviation of the second signal.

3. The method of claim 2 wherein the first signal comprises an information signal and the second signal comprises a supervisory signal.

4. The method of claim 1 wherein the predetermined threshold corresponds to a signal to noise ratio needed by a receiving communication unit to maintain communication link continuity.

5. The method of claim 1 wherein the modulating signal comprises a sub-audible supervisory signal for controlling muting operations and providing communication link continuity during discontinuous voice transmission modes between a remote cellular radiotelephone and a cellular base site in a cellular-type communication system.

6. The method of claim 1 wherein:
   (a) the decreasing power of a carrier signal step is performed in response to a first event;
   (b) the increasing frequency deviation of a modulating signal to a point not to exceed a predetermined bandwidth step is performed in response to the first event;
   (c) the method further comprises the step of decreasing frequency deviation of the modulating signal, in response to a subsequent second event; and
   (d) the method further comprises the step of increasing power of the carrier signal to a predetermined level, in response to the subsequent second event.

7. A communication unit, comprising:
   (a) modulating means for modulating a carrier signal;
   (b) power control means, operably coupled to the modulating means, for decreasing power of the modulated carrier signal; and
   (c) deviation control means, operably coupled to the modulating means, for increasing frequency deviation of a modulating signal to a point not to exceed a predetermined bandwidth such that the signal to noise ratio of the modulated carrier signal is maintained at a predetermined threshold.

8. The communication unit of claim 7 wherein:
   (a) the modulating signal is comprised of a first and a second signal; and
   (b) the deviation control means comprises means for removing a portion of the first signal from the modulating signal and increasing the frequency deviation of the second signal.

9. The communication unit of claim 8 wherein the first signal comprises an information signal and the second signal comprises a supervisory signal.

10. The communication unit of claim 7 wherein the predetermined threshold corresponds to a signal to noise ratio needed by a receiving communication unit to maintain communication link continuity.

11. The communication unit of claim 7 wherein the modulating signal comprises a sub-audible supervisory signal for controlling muting operations and providing communication link continuity during discontinuous voice transmission modes between a remote cellular radiotelephone and a cellular base site in a cellular-type communication system.

12. The communication unit of claim 7 wherein:
   (a) the deviation control means increases frequency deviation of the modulating signal to a point not to exceed a predetermined bandwidth in response to the first event;
   (b) the power control means decreases power of the modulated carrier signal in response to a first event;
   (c) the deviation control means comprises means for decreasing frequency deviation of the modulating signal, in response to a second event; and
   (d) the power control means comprises means for increasing power of the carrier signal to a predetermined level, in response to the second event.

13. A method for providing supervisory control while maintaining communication link continuity, comprising the steps of:
   (a) detecting a continuous supervisory signal, the supervisory signal having a first and a second signaling format, the first format comprising a carrier signal at a predetermined power level which is modulated by a modulating signal of a predetermined frequency deviation, the second signaling format comprising a carrier signal having a power level less than the predetermined power level which is modulated by a modulating signal having a frequency deviation greater than the predetermined frequency deviation;
   (b) comparing a portion of the detected supervisory signal to a known supervisory unmuting signal and a known supervisory muting signal;
   (c) unmuting audio for subsequently received signals, if the portion of the detected supervisory signal is substantially similar to the known supervisory unmuting signal; and
   (d) muting audio for subsequently received signals, if the portion of the detected supervisory signal is substantially similar to a known supervisory muting signal.

14. The method of claim 13 wherein the detected continuous supervisory signal comprises a sub-audible supervisory signal for controlling muting operations and providing communication link continuity during discontinuous voice transmission modes between a remote cellular radiotelephone and a cellular base site in a cellular-type communication system.

15. The method of claim 13 wherein:
   (a) the step of comparing comprises comparing a previously received portion of the detected supervisory signal to the known supervisory muting signal; and
   (b) the step of unmuting audio for subsequently received signals is performed only if the previously received portion of the detected supervisory signal is substantially similar to the known supervisory muting signal.

16. The method of claim 15 wherein the step of comparing a previously received portion of the detected supervisory signal further comprises determining whether the previous received portion of the detected supervisory signal is valid based upon a predetermined bit error limit.

17. A communication unit, comprising:
   (a) detecting means for detecting a supervisory signal, the supervisory signal having a first and a second signaling format, the first format comprising a carrier signal at a predetermined power level which is modulated by a modulating signal of a predetermined frequency deviation, the second signaling format comprising a carrier signal having a power level less than the predetermined power level which is modulated by a modulating signal having a frequency deviation greater than the predetermined frequency deviation;
   (b) comparing means, operably coupled to the detecting means, for comparing a portion of the detected supervisory signal to a known supervisory unmuting signal and a known supervisory muting signal;
   (c) unmuting means, operably coupled to the comparing means, for unmuting audio for subsequently received signals, if the portion of the detected supervisory signal is substantially similar to the known supervisory unmuting signal; and
   (d) muting means, operably coupled to the comparing means, for muting audio for subsequently received signals, if the portion of the detected supervisory signal is substantially similar to a known supervisory muting signal.

18. The communication unit of claim 17 wherein the detected supervisory signal comprises a sub-audible supervisory signal for controlling muting operations and providing communication link continuity during discontinuous voice transmission modes between a remote cellular radiotelephone and a cellular base site in a cellular-type communication system.

19. The communication unit of claim 17 wherein:
   (a) the comparing means comprises means for comparing a previously received portion of the detected supervisory signal to the known supervisory muting signal; and
   (b) the unmuting means only unmutes the audio for subsequently received signals if the previously received portion of the detected supervisory signal is substantially similar to the known supervisory muting signal.

20. The communication unit of claim 19 wherein the means for comparing a previously received portion of the detected supervisory signal to the known supervisory muting signal comprises determining whether the previous received portion of the detected supervisory signal is valid based upon a predetermined bit error limit.

* * * * *